US 6,668,976 B2

(12) United States Patent
Graham, Jr. et al.

(10) Patent No.: US 6,668,976 B2
(45) Date of Patent: *Dec. 30, 2003

(54) ADJUSTABLE TREE STAND

(76) Inventors: Thomas E. Graham, Jr., P.O. Box 7127, Wilmington, NC (US) 28406; Thomas E. Graham, Sr., P.O. Box 7127, Wilmington, NC (US) 28406; Christopher L. Graham, P.O. Box 7127, Wilmington, NC (US) 28406

( * ) Notice: Subject to any disclaimer, the term of this patent is extended or adjusted under 35 U.S.C. 154(b) by 0 days.

This patent is subject to a terminal disclaimer.

(21) Appl. No.: 10/370,905

(22) Filed: Feb. 20, 2003

(65) Prior Publication Data

US 2003/0121723 A1 Jul. 3, 2003

Related U.S. Application Data

(63) Continuation of application No. 09/947,254, filed on Sep. 5, 2001, now Pat. No. 6,523,642.

(51) Int. Cl.[7] ............................ A63B 27/00; E04G 3/00
(52) U.S. Cl. ........................................ 182/136; 182/187
(58) Field of Search ................................ 182/134–136, 182/187, 188, 116, 20; 108/152; 297/217.7; 248/218.4; 224/155

(56) References Cited

U.S. PATENT DOCUMENTS

| | | | | | |
|---|---|---|---|---|---|
| 4,428,459 | A | * | 1/1984 | Peck | 182/187 |
| 4,802,552 | A | * | 2/1989 | Williams | 182/187 |
| 4,890,694 | A | * | 1/1990 | Williams | 182/187 |
| 4,909,353 | A | * | 3/1990 | Govin et al. | 182/187 |
| 5,086,874 | A | * | 2/1992 | Treants | 182/136 |
| 5,097,925 | A | * | 3/1992 | Walker, Jr. | 182/135 |
| 5,101,934 | A | * | 4/1992 | Zumbro | 182/187 |
| 5,156,236 | A | * | 10/1992 | Gardner | 182/187 |
| 5,167,298 | A | * | 12/1992 | Porter | 182/187 |
| 5,234,076 | A | * | 8/1993 | Louk et al. | 182/187 |
| 5,234,077 | A | * | 8/1993 | Sheriff | 182/187 |
| 5,265,780 | A | * | 11/1993 | Matthews et al. | 224/155 |
| 5,588,499 | A | * | 12/1996 | Carriere | 182/135 |
| 5,590,738 | A | * | 1/1997 | Hunt et al. | 182/116 |
| 5,680,910 | A | * | 10/1997 | Sarphie, IV | 182/135 |
| 5,921,348 | A | * | 7/1999 | Louk et al. | 182/187 |
| 5,979,603 | A | * | 11/1999 | Woller | 182/187 |
| 5,996,738 | A | * | 12/1999 | Nelsen | 182/135 |
| 6,182,792 | B1 | * | 2/2001 | Woller et al. | 182/187 |
| 6,308,801 | B1 | * | 10/2001 | Futch | 182/136 |

\* cited by examiner

Primary Examiner—Hugh B. Thompson
(74) Attorney, Agent, or Firm—MacCord Mason PLLC

(57) ABSTRACT

A tree stand that includes a seating section and a standing section, each including inclined attachment bars adjacent the section sides, and seating and standing section cables, each having first and second ends with handles at each of the ends. Each attachment bar has outer and inner faces with a plurality of spaced, aligned attachment holes extending between the faces, and a plurality of spaced, aligned latch holes alternating with the attachment holes. Each of the handles including a pair of flanged projections insertable into adjacent attachment holes in an attachment bar, and a latch pin insertable into a latch hole between the adjacent holes. Each projection is moveable from an insertion position to a locked position within a hole when the cable is tensioned, and is prevented by the latch pin from moving back to the insertion position when the cable is relaxed.

20 Claims, 3 Drawing Sheets

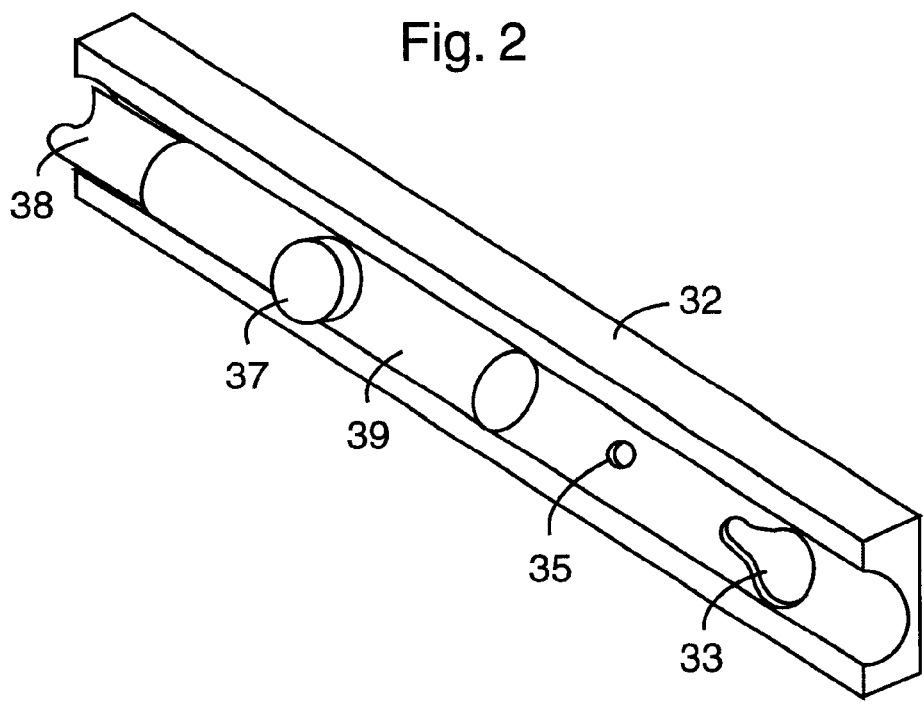
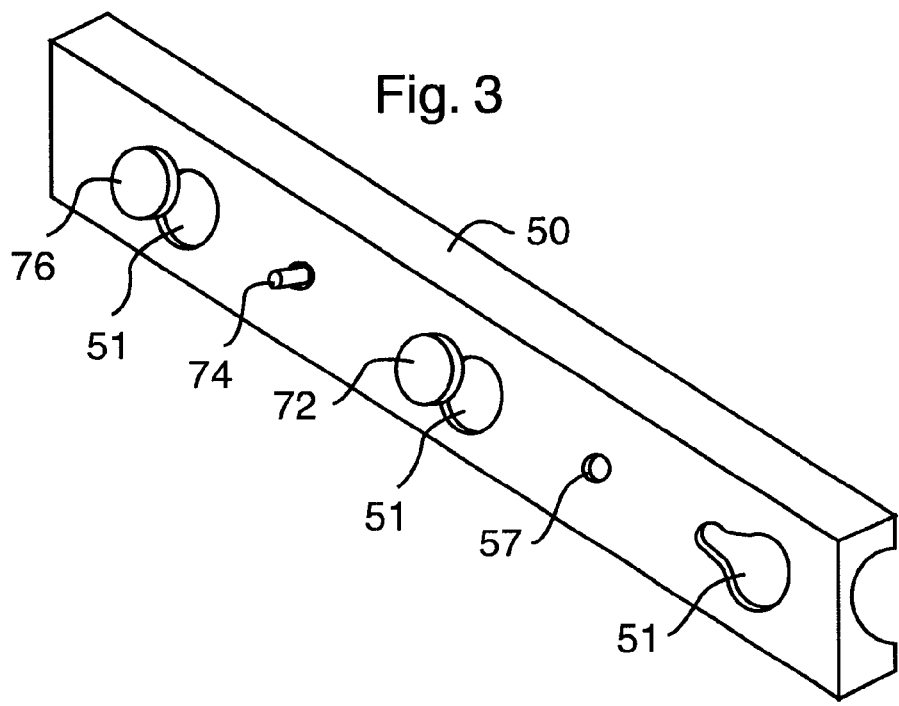

ADJUSTABLE TREE STAND

This is a Continuation of application Ser. No. 09/947,254 filed Sep. 5, 2001, now U.S. Pat. No. 6,523,642.

BACKGROUND OF THE INVENTION (1) Field of the Invention

The present invention relates generally to a tree stand of the type used by hunters to ascend a tree and provide an elevated seat thereon, and in particular to a tree stand that can be adjusted as the hunter ascends or descends the tree to provide a level and secure platform.

(2) Description of the Prior Art

Tree stands used to provide an elevated seat for hunters are well known in the prior art. One type of stand, known as a climbing tree stand, is constructed of a seating section and a standing section. The sections are attached to a tree with the seating section being above the standing section. The hunter then raises the sections in an alternating fashion to elevate the stand to the desired height on the tree.

Stand sections are releasably secured to the tree by flexible attaching members that extend around the tree from one side of the stand section to the other side. U.S. Pat. Nos. 6,182,792; 5,234,076; and 5,097,925 are all examples of climbing tree stands using flexible cables as attaching members. While cable has various advantages over other attaching means, these prior art disclosures require insertion of one or both ends of a support cable into relatively narrow support arm tubes, and then inserting a pin through a hole in the side of the tube and a hole in the end of the cable in order to secure the cable in place. Threading a cable inside a narrow tube while at the same time attempting to locate a cable attachment point is cumbersome in daylight, and nearly impossible at night. What is needed is an improved way to attach a cable to a tree stand section without having to thread the cable into a tube.

SUMMARY OF THE INVENTION

The present invention is directed to a tree-climbing device for improving the ease and safety of tree climbing. The invention relates especially to a tree stand that can be readily adjusted to changes in trunk diameter when ascending or descending the tree, providing a secure platform that can be adjusted to a horizontal position to accommodate changes in tree trunk diameter.

Generally, the tree stand of the present invention is comprised of a standing section and a seating section. The standing section includes a frame with an inner end and an outer end connected by side members, and a platform supported on the frame. A tree gripper or gripping section, normally a V-shaped, toothed member, extends inwardly from the inner end of the frame. The seating section is similarly constructed with a frame having inner and outer ends connected by side members, and a tree gripping section extending inwardly from the inner end of the frame. Instead of a standing platform, the seating section includes a seat, which may be fixed or moveable, supported by the frame.

Tree stands of the above general configuration are known in the art. The present invention is specifically directed to a unique means for attaching tree stands of this general configuration to a tree so that the stand is securely attached, yet readily adjustable to accommodate changes in the tree diameter when the tree is being ascended or descended. More specifically, each frame section of the present tree stand includes support or attachment members on each side of the frame, and a cable or other lashing member that is extendable around the tree trunk from one attachment member to the other, and releasably attachable to one of the attachment members by a unique attachment means.

At least one of the attachment members, preferably both attachment members, includes a an exterior side, e.g., the top side or outer side, with a plurality of first mating elements adapted to mate with a corresponding second mating element adjacent one end of the lashing member. As used herein, the term "lashing member" is intended to include elongated flexible, straps or bands that are of a sufficient length to extend around an average tree from one side of attachment member to the other. Exemplary lashing members include cables, cords, ropes, woven straps, etc. Preferably, the lashing member is a twisted wire cable with a smooth sleeve, such as a wear-resistant plastic sleeve.

One of the mating elements is in the form of a projection, while the other mating element is a recess, the term including a hole, with the projection element being removably insertable into the recess. The projection element is moveable within the recess from an insertion position to a locked position when said cable is tensioned. In the locked position, the projection is prevented from being removed from the attachment member. Preferably, the attachment member has outer and inner walls, the recesses are holes, and the projection includes a flange, cap or other component that abuts the inner wall of the attachment member when the projection is in the locked position.

Normally, the attachment members will be attached on either side of each frame. The attachment member may be inclined towards the inner end of the standing section frame. The attachment member may be a rectangular tube with four sides, each side having an exterior and an interior surface. Preferably, the attachment member is a solid bar with outer and inner surfaces. The attachment member preferably includes a plurality of equidistant mating elements extending axially along the outer surface of the attachment member.

In a preferred embodiment, each attachment member is an inclined solid bar with inner and outer surfaces, and a plurality of axially aligned holes extending between the bar inner and outer surfaces. The lashing member is a cable with an attachment handle at each end. Each attachment handle includes at least one projection that is insertable into a hole in the attachment member, with the projection being moveable within the hole between an insertion position and a locked position when the cable is tensioned.

The projection may include a distal end with flange or cap adapted to engage the inner surface of the attachment member when the projection is in the locked position. Preferably, each of the holes has an insertion end of a first given width and a locking end of a second given width, and the projection includes an end cap with a third given width, with the third given width being less than said first given width and greater than said second given width, whereby the end cap prevents removal of the projection from the hole when the projection is in the locked end of the hole.

In order to hold the projection in the locked position during use of the tree stand, even if the tension on the cable is temporarily relieved, such as when the stand is being moved to a different position on the tree, each attachment handle preferably also includes a latch member to hold the projection in the locked position, with the attachment member including a latch recess, such as a latch hole, to receive the latch member. The latch member may include an inner end for insertion into the recess, and an outer end with a gripping element to manipulate the latch member. The latch pin may include an extended position and a retracted position, with a spring to urge the latch member to its extended position and hold the latch in the recess during use.

To minimize the projection of the attachment handle and cable from the attachment member, and thereby reduce the risk of snagging, the outer surface of the attachment member may include an axially aligned trough, e.g., a semi-circular trough, to receive the attachment handle and the cable. The holes may be in the bottom of the trough. For example, the trough may be on the outer side of the attachment member.

In operation, a climber places the tree gripping section of the standing section against a tree trunk. Next a lashing member, typically a cable is extended or looped around the tree trunk to be climbed. Usually, one end of the cable is already attached to the inner end of one attachment member. The climber tensions the cable by pulling on a handle terminating the unsecured end of the cable. Next, a first mating member on the unattached attachment member is selected such that when mated with a second mating member on the handle the cable remains under tension. A plurality of first mating members on the attachment member generally takes the form of holes. The second mating members or member on the handle generally take the form of a projection or flanged stud.

Next, the climber inserts the handle projection into the insertion end of the selected hole. In order to lock the attachment handle to the attachment member, the climber moves the handle projection within the hole from the insertion end to the locked end. In a preferred embodiment the climber would further secure the cable to the attachment member by releasing a spring urged pin into a latch recess while the handle projection is in the locked position. This action latches the cable to the attachment member even in the event that the tension on the cable is relaxed. At this point the standing section is capable of supporting the climber's weight and can safely be stood upon.

Next, the climber places the seating section waist high and directly above the standing section making sure that the seating section tree gripping section is engaging the tree trunk. As with the standing section, one end of the cable normally is already attached to the inner end of one of the seating section support arms. Similar to the procedure described for the standing section, the climber loops or extends the free end of the seating section cable around the tree trunk. The climber then tensions the cable by pulling on a handle terminating the unsecured end of the cable. To hold the tension the climber selects the appropriate hole on the remaining attachment member, positions the handle projection within the insertion point of the hole and then moves the handle projection to the locked position. In order to further secure the cable to the attachment member the climber releases a spring-urged latch pin into a latch recess. The seating section is now ready to safely hold the climber's full weight.

To ascend the tree, the climber places his or her feet in a restraint extending across the standing section platform. The climber then rests his or her weight on the seat of the seating section while using his or her feet and legs to pull the standing section upward. The climber then stands and, using his or her hands, raises the seating section to a waist high position. The climber then sits and again raises the standing section with his or her feet and legs.

Accordingly, one aspect of the present invention is to provide a tree stand comprising a seating section including a seating section attachment member; a standing section including a standing section attachment member; a seating section lashing member having first and second ends; and a standing section lashing member having first and second ends, each of the attachment members having an exterior side with a plurality of spaced, aligned, first mating elements, and at least one end of each lashing member including a second mating element attachable to a first mating element, one of the mating elements being a recess, and the other of the mating elements being a projection insertable into the first mating element.

Another aspect of the invention is to provide a tree stand comprising a seating section including a frame with inner and outer ends, sides connecting the ends, and first and second seating section elongated attachment members adjacent the seating section sides and extending toward the seating section inner end; a standing section including a frame with inner and outer ends, sides connecting the ends, and first and second standing section elongated attachment members adjacent the standing section sides and extending toward the standing section inner end; a seating section lashing member having a first end attachable to the first seating section attachment member and a second end attachable to the second seating section attachment member; and a standing section lashing member having a first end attachable to the first standing section attachment member and a second end attachable to the second standing section attachment member, each of the seating section and standing section attachment members having an exterior side with a plurality of spaced, aligned holes, and each end of each lashing member including at least one projection insertable into one of the holes.

Another aspect of the invention is to provide a tree stand for use in climbing a tree comprising a seating section including a frame with inner and outer ends, sides connecting the ends, and first and second seating section elongated attachment members adjacent the seating section sides and extending toward the seating section inner end; a standing section including a frame with inner and outer ends, sides connecting the ends, and first and second standing section elongated attachment members adjacent the standing section sides and extending toward the standing section inner end; a seating section cable having first ends with handles at each of the ends; and a standing section cable having first ends with handles at each of the ends, each of the seating section and standing section attachment members having an exterior surface with a plurality of spaced, aligned, attachment holes and a plurality of spaced, aligned, latch holes alternating with the attachment holes, each of the handles including at least one projection insertable into one of the attachment holes, and a latch pin insertable into one of the latch holes.

Still another aspect of the invention is to provide a tree stand comprising a seating section including a frame with inner and outer ends, sides connecting the ends, and first and second seating section elongated attachment bars adjacent the seating section sides and inclined toward the seating section inner end; a standing section including a frame with inner and outer ends, sides connecting the ends, and first and second standing section elongated attachment bars adjacent the standing section sides and inclined toward the standing section inner end; a seating section cable having first and second ends with handles at each of the ends; and a standing section cable having first and second ends with handles at each of the ends, each of the seating section and standing section attachment bars having outer and inner faces with a plurality of spaced, aligned attachment holes extending between the faces, and a plurality of spaced, aligned latch holes alternating with the attachment holes, each of the handles including a pair of flanged projections insertable into adjacent attachment holes in an attachment bar, and a latch pin insertable into a latch hole between the adjacent holes.

These and other aspects of the present invention will become apparent to those skilled in the art after a reading of the following description of the preferred embodiment.

BRIEF DESCRIPTION OF THE DRAWINGS

FIG. 2 is an enlarged view of an attachment member from FIG. 1 depicting an attachment handle and lashing member in the locked position.

FIG. 3 is the reverse view of an attachment member like that of FIG. 2.

DETAILED DESCRIPTION OF THE INVENTION

In the following description, terms such as horizontal, upright, vertical, above, below, beneath, and the like, are used solely for the purpose of clarity in illustrating the invention, and should not be taken as words of limitation. The drawings are for the purpose of illustrating the invention and are not intended to be to scale.

Figure 1:
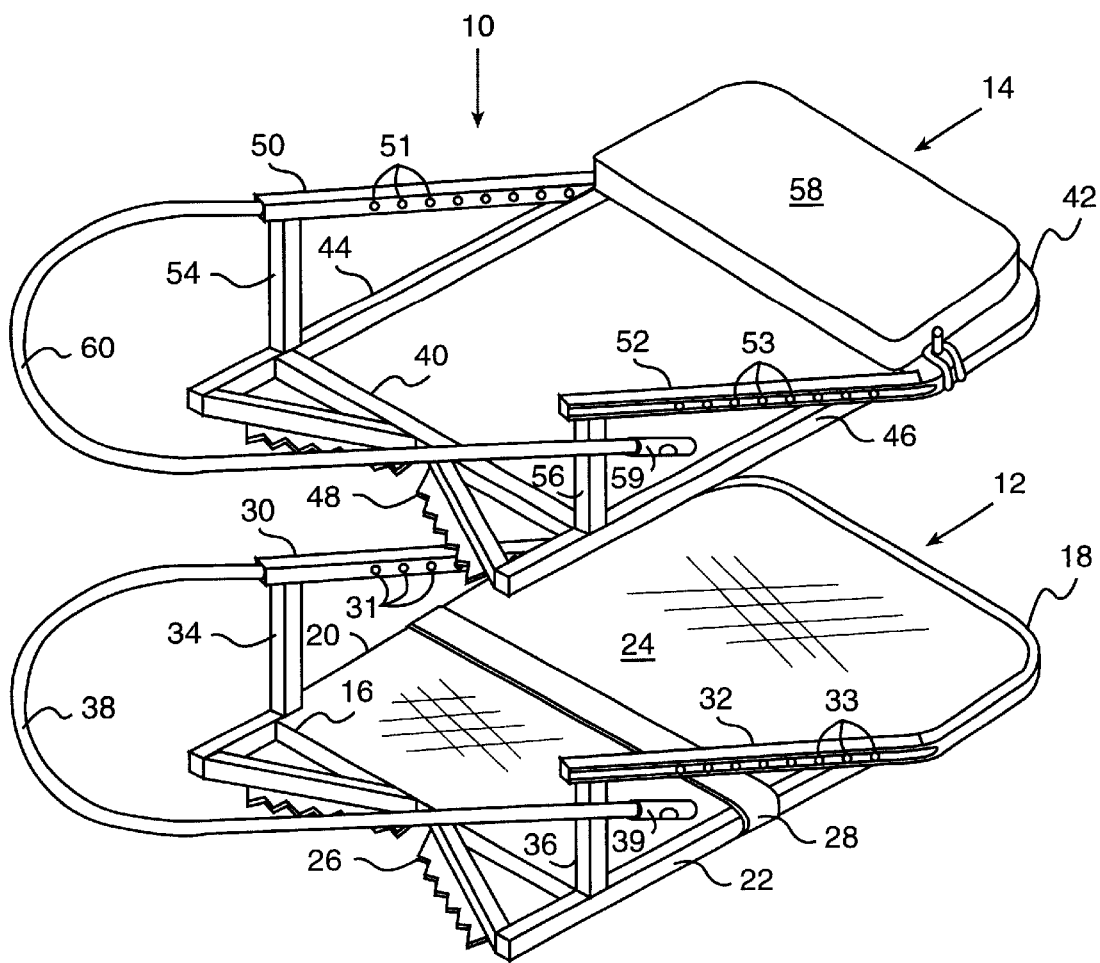
FIG. 1 is a perspective view of the tree stand showing the seating section and standing section.

Referring to the drawings and first to FIG. 1, a tree stand 10 comprises a standing section 12 and a seating section 14. Standing section 12 includes a frame with an inner end 16 and an outer end 18 connected by side members 20 and 22. A platform 24 for standing is supported on the standing section frame. A tree gripping section 26, normally a V-shaped, tooth member, extends inwardly from inner end 16. A restraint 28 for a climber's feet extends across platform 24. Furthermore, the outer ends of two support or attachment members, 30 and 32 on each side of the frame connect to side members 20 and 22 near outer end 18, and rise on an incline towards inner end 16. Connecting members 34 and 36 join side members 20 and 22 to the inner ends of attachment members 30 and 32, respectively. Standing section 12 also includes a lashing member 38 having first and second ends with attachment handles 39 releasibly attachable to a plurality of mating elements 31 and 33 axially aligned along attachment members 30 and 32.

Seating section 14 includes a frame with an inner end 40 and an outer end 42 connected by side members 44 and 46. A tree gripping section 48, normally a V-shaped, tooth member, extends inwardly from inner end 40. The outer ends of two attachment members 50 and 52 on each side of the frame connect to side members 44 and 46 near outer end 42. Both of side members 50 and 52 rise on an incline towards inner end 40. Connecting members 54 and 56, join side members 44 and 46 to the inner ends of attachment members 50 and 52 respectively. Side members 46 and 44 support a seat 58. Seating section 14 also includes a lashing member 60 having first and second ends terminated by at least one attachment handle 59 releasibly attachable to a plurality of mating elements 51 and 53 axially aligned along attachment members 50 and 52.

Referring now to FIG. 2, attachment member 32 is a solid bar having the shape of an elongated, axially aligned, semi-circular trough. The plurality of mating elements 33 aligned along attachment member 32 as shown in FIG. 1 is represented again in greater detail in FIG. 2 illustrated in singular form as a hole 33. Each hole 33 has an enlarged insertion end of a first given width and a smaller locking end of a second given width, with the second given width being less than the first given width. The locking end of hole 33 is towards the inner end of attachment member 32. Latch recess holes 35 alternate with holes 33.

Figure 4:
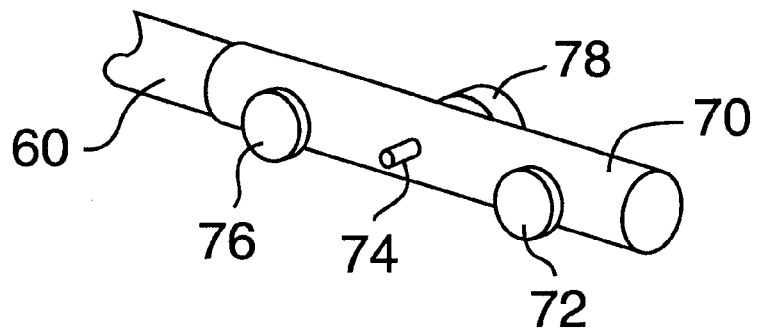
FIG. 4 shows a detailed perspective view of an attachment handle.
Figure 5:
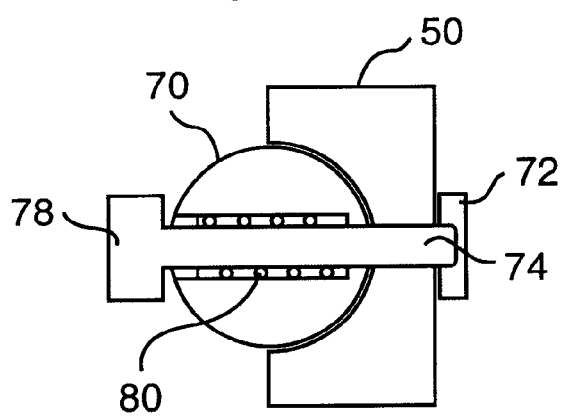
FIG. 5 is a sectional end view of an attachment handle in the locked and latched position.

Attachment handle 39 is secured to the end of lashing member 38. FIG. 2 depicts attachment handle 39 in the locked position. In this position handle 39 is partially recessed inside the trough of attachment member 32 helping prevent handle 39 from accidentally becoming snagged by foreign objects. Referring now to FIG. 3 and FIG. 4, an attachment handle 70, identical to attachment handles 39 and 59 shown in FIG. 1, includes flanged or capped studs 74 and 76 located opposite a knob 78 which connects to one end of latch pin 74. FIG. 3 shows the flanges or caps of studs 72 and 76 in the locked position on attachment member 50. The width of the flange or cap of each stud is greater than the width of the locking end of each hole 33. Thus each flange is prevented from detachment when in the locked position. The tip of latch recess pin 74 prevents studs 72 and 76 from moving from the locked position to the insertion position in the event cable tension is lost. FIG. 5 depicts a cross-sectional view of attachment handle 70 locked and latched onto attachment member 50. A spring 80 urges latch pin 74 into a latch recess identical to latch recess 57.

In operation, a climber places tree-gripping section 26 of the standing section 12 against a tree trunk. Next lashing member 38 preferably a cable is extended or looped around the tree trunk to be climbed. Usually, one end of the cable is already attached to the inner end of one attachment member. The climber tensions cable 38 by pulling on a handle 39, and inserts handle projections 72 and 76 into the insertion ends of a pair of adjacent holes 51. The climber then tensions cable 38 to move attachment handle projections 72 and 76 within holes 51 from the insertion position to the smaller locking ends of holes 51. The climber then inserts pin 74 into a latch recess 57 while projections 72 and 76 are in their locked position, securing cable 38 even if the tension on cable 38 is relaxed. At this point standing section 12 is capable of supporting the climber's weight and can be stood upon safely.

Next, the climber places seating section 14 waist high and directly above standing section 12 making sure that seating section tree gripping section 48 is engaging the tree trunk. As with standing section 12, one end of the cable normally is already attached to the inner end of one of seating section support arms 50 and 52. Similar to the procedure described for standing section 12, the climber loops or extends the free end of the seating section cable 60 around the tree trunk. The climber then tensions the cable by pulling on handle 59. To hold the tension, the climber selects appropriate holes 51 on the attachment member 52, and positions handle projections similar to 72 and 76 within the insertion ends of holes 51. The climber then moves the handle projections to their locked position and secures the projections in place by inserting the latch. Seating section 14 is now ready to safely hold the climber's full weight.

To ascend the tree, a climber places his or her feet in a restraint 28 extending across standing section platform 12. The climber then rests his or her weight on seat 58 of seating section 14 while using his or her feet and legs to pull standing section 12 upward to meet seating section 14. After that, the climber stands and using his or her hands raises seating section 14 to a waist high position. The climber then sits and again raises standing section 12 with his or her feet and legs.

Certain modifications and improvements will occur to those skilled in the art upon a reading of the foregoing description. It should be understood that all such modifications and improvements have been deleted herein for the sake of conciseness and readability but are properly within the scope of the following claims.

What is claimed is:

1. A tree stand for use in climbing a tree comprising:
   a) a seating section including seating section attachment bars;
   b) a standing section including standing section attachment bars;
   c) a seating section lashing member having first and second ends; and
   d) a standing section lashing member having first and second ends, each of said attachment bars having a plurality of spaced, holes with an insertion end of a first given width and a locking end of a second given width, and at least one end of each of said lashing members having a projection including an end cap with a third given width, said third given width being less than said first given width and greater than said second given width, whereby said end cap prevents removal of said projection from said hole when said projection is in the locking end of said hole.

2. The tree stand of claim 1, wherein each of said sections includes spaced, parallel attachment bars.

3. The tree stand of claim 1, wherein each of said sections includes an inner end and an outer end, the locking end of said holes being toward said inner end.

4. The tree stand of claim 1, wherein said seating section lashing members have projections including an end cap with a third given width at both the first and second ends.

5. The tree stand of claim 1, wherein each lashing member includes a latching member to releasibly secure said lashing member to said attachment members.

6. The tree stand of claim 1, wherein said projections are insertable into said insertion end of said holes and moveable to said locking end upon tensioning of said lashing member.

7. The tree stand of claim 1, wherein the bars on at least one of said sections have outer and inner sides, said attachment holes extending through said attachment bars from said outer side to said inner side.

8. The tree stand of claim 7, wherein each of said outer sides include axially aligned troughs for receiving said lashing members.

9. The tree stand of claim 1, wherein said attachment bars have inner and outer ends and are inclined upwardly toward said inner ends.

10. A tree stand for use in climbing a tree comprising:
    a) a seating section including a frame with inner and outer ends, sides connecting said ends, and first and second seating section elongated attachment bars adjacent said seating section sides and extending toward said seating section inner end;
    b) a standing section including a frame with inner and outer ends, sides connecting said ends, and first and second standing section elongated attachment bars adjacent said standing section sides and extending toward said standing section inner end;
    c) a seating section lashing member having a first end attachable to said first seating section attachment bar and a second end attachable to said second seating section attachment bar; and
    d) a standing section lashing member having a first end attachable to said first standing section attachment bar and a second end attachable to said second standing section attachment bar, each of said seating section and standing section attachment bars having a plurality of spaced holes extending through said attachment bar, and each end of each lashing member including at least one projection insertable into a selected one of said holes, wherein each of said holes has an insertion end of a first given width and a locking end of a second given width, and each of said projections include an end cap with a third given width, said third given width being less than said first given width and greater than said second given width, whereby said end caps prevent removal of said projections from said holes when said projections are in the locking end of said holes.

11. The tree stand of claim 10, wherein said seating section lashing member and said standing section lashing member are comprised of a wire-cable with a plastic covering.

12. The tree stand of claim 10, wherein each of said lashing members includes handles at each end.

13. The tree stand of claim 10, wherein each of said projections is insertable into the insertion end of said holes and is moveable to the locking end upon tensioning of said lashing member.

14. The tree stand of claim 10, wherein the attachment bars on at least one of said sections have outer and inner sides, with said attachment holes extending through said attachment bars from said outer side to said inner side.

15. The tree stand of claim 14, wherein said outer sides include axially aligned troughs for receiving said lashing members.

16. The tree stand of claim 14, wherein said attachment bars are inclined upwardly toward said inner ends.

17. A tree stand for use in climbing a tree comprising:
    a) a seating section including a frame with inner and outer ends, sides connecting said ends, and first and second seating section elongated attachment bars adjacent said seating section sides and inclined upwardly toward said seating section inner end;
    b) a standing section including a frame with inner and outer ends, sides connecting said ends, and first and second standing section elongated attachment bars adjacent said standing section sides and inclined upwardly toward said standing section inner end;
    c) a seating section cable having first and second ends with handles with projections at each of said first and second ends; and
    d) a standing section cable having first and second ends with handles with projections at each of said ends, each of said seating section and standing section attachment bars having opposed faces with a plurality of spaced, aligned attachment holes extending between said faces, each of said holes having an insertion end of a first given width and a locking end of a second given width, and each of said projections including an end cap with a third given width, said third given width being less than said first given width and greater than said second given width, whereby said end caps prevent removal of said projections from said holes when said projections are in the locking end of said holes.

18. The tree stand of claim 17, wherein said handles further include a locking means to secure said projections in the locking ends of said holes.

19. The tree stand of claim 17, wherein said lashing members are comprised of a wire cable with a plastic covering.

20. The tree stand of claim 17, wherein the attachment bars on at least one of said sections have outer faces including axially aligned troughs to receive said lashing member handles.

* * * * *